US010254437B2

United States Patent
Teague et al.

(10) Patent No.: US 10,254,437 B2
(45) Date of Patent: Apr. 9, 2019

(54) TEMPERATURE PERFORMANCE OF A SCINTILLATOR-BASED RADIATION DETECTOR SYSTEM

(71) Applicant: Visuray Intech Ltd (BVI), Road Town, Tortola (VG)

(72) Inventors: Philip Teague, Houston, TX (US); Alex Stewart, San Francisco, CA (US)

(73) Assignee: VISURAY INTECH LTD (BVI), Tortola (VG)

( * ) Notice: Subject to any disclaimer, the term of this patent is extended or adjusted under 35 U.S.C. 154(b) by 0 days.

(21) Appl. No.: 15/951,874

(22) Filed: Apr. 12, 2018

(65) Prior Publication Data
US 2018/0231683 A1    Aug. 16, 2018

Related U.S. Application Data

(60) Provisional application No. 62/484,611, filed on Apr. 12, 2017.

(51) Int. Cl.
*G01T 1/20* (2006.01)
*G01V 5/06* (2006.01)
(Continued)

(52) U.S. Cl.
CPC ............ *G01V 5/06* (2013.01); *G01T 1/20* (2013.01); *G01V 5/08* (2013.01); *G21F 3/00* (2013.01)

(58) Field of Classification Search
CPC ............ G01T 1/20; G01V 5/06; G21F 3/00
See application file for complete search history.

(56) References Cited

U.S. PATENT DOCUMENTS

| 2013/0329859 A1* | 12/2013 | Groves | G01T 1/20 378/88 |
| 2015/0221796 A1 | 8/2015 | Smith et al. | |
| 2018/0188412 A1* | 7/2018 | Beekman | G01V 5/125 |

FOREIGN PATENT DOCUMENTS

WO      2012058564 A2    5/2012

OTHER PUBLICATIONS

Notification of Transmittal of the International Search Report and the Written Opinion of the International Searching Authority, or the Declaration issued in the corresponding PCT International Application No. PCT/US2018/027338, dated Jul. 24, 2018 (11 pages).

* cited by examiner

*Primary Examiner* — Mark R Gaworecki
(74) *Attorney, Agent, or Firm* — Raymond R. Ferrera; Adams and Reese LLP

(57) ABSTRACT

A downhole segmented radiation detector tool measuring formations surrounding a borehole is provided, the tool including at least a plurality of segments capable of detecting radiation, wherein the segments return to the tool after interacting with material surrounding the tool; and radiation shielding configured to allow radiation directly from a radiation source to pass internally through the downhole tool to a reference segment. A method of measuring formations surrounding a borehole is also provided, the method including at least: lowering a downhole tool into a borehole surrounded by a subterranean formation; detecting a first plurality of X-rays or gamma-rays that return to the downhole tool after interacting with materials surrounding the downhole tool using a first segment of an array segmented radiation detector; and configuring associated radiation shielding to allow radiation directly from a radiation source to pass internally through the downhole tool to the reference segment.

8 Claims, 2 Drawing Sheets

(51) Int. Cl.
*G01V 5/08* (2006.01)
*G21F 3/00* (2006.01)

TEMPERATURE PERFORMANCE OF A SCINTILLATOR-BASED RADIATION DETECTOR SYSTEM

TECHNICAL FIELD

The present invention relates generally to methods and means for improving a scintillator-based radiation detector system's temperature performance, and in a particular though non-limiting embodiment to methods and means for improving a scintillator-based radiation detector system's temperature performance by segmenting a monolithic detector substrate volume into an array that minimizes thermally-induced dark current within smaller pixels, thereby enabling a statistical averaging of scintillator pixels with defects and unreasonable signals and suppressing dark current-induced reduction of the signal-to-noise at increasing temperatures.

BACKGROUND

Within the oil & gas industry, borehole logging typically relies upon detector types that are either tolerant to high temperatures (equal to or greater than 125° C.), e.g., photomultiplier tubes (PMTs) capable of operating at temperatures as high as 200° C., or complementary metal-oxide-semiconductor (CMOS)/charge-couple device (CCD) or photodiodes capable of operating up to between 80° C. and 100° C. but require active cooling.

Because the cooling of detectors and their associated electronics requires either a passive or active cooling method integrated into the downhole tool as an additional system, tool designers typically prefer using PMTs and scintillator crystal combinations for their ability to operate within the borehole's environmental temperatures.

For example, a typical borehole logging tool consists of a pressure housing and a PMT bonded to a scintillator, e.g., sodium iodide, cesium iodide or lanthanum bromide, located within a void within shielding material, e.g., tungsten. A radially/axially-oriented hole within the shield acts as a collimator window to permit radiation from a specific angle to enter the scintillator through the pressure housing. The pressure housing may have a "window" directly over the outer portion of the collimator, comprising a material, e.g., titanium or beryllium, attenuating the signal less than that of typical pressure housing materials.

Due to the physical requirement of the light produced within the scintillating crystals through the conversion of incident x-rays or gamma-rays needing to reflect on the internal surfaces of the scintillator crystal, the crystals are typically produced in a cylindrical format with polished ends or sides, which ensures the produced light has a high probability of reaching the PMT, due to the optimized numeric aperture of the crystal.

Similarly, PMTs are made cylindrical as a convenient geometry to withstand external atmospheric pressure, due to the inside of the PMT being evacuated (vacuum) to permit the movement of electrons.

However, the minimum size of the scintillator crystal and PMT is limited, such that current technology does not permit PMTs to be made smaller than 10-15 mm in diameter, which becomes a limiting factor when more than one PMT needs to be located within the same region within a tool, e.g., to enable detection of radiation from multiple azimuths within the same axial region of the tool. Eliminating the use of PMTs and scintillator combinations, and developing smaller detectors based upon CMOS or CCD substrates capable of operating at high-temperature would still require active cooling to achieve normal operation in the borehole's high environmental temperatures.

While prior references employ techniques using collimators, scintillators, and photomultipliers for measuring radiation, and even use of segmented scintillators creating two-dimensional images of the incoming radiation, none teach the practice of segmenting a scintillating material such that the thermally induced dark current developed within scintillator volumes as a function of temperature can be suppressed statistically as a function of sampling many, smaller scintillator volumes, each having a lower dark current than a large single monolithic volume.

For example, U.S. Pat. No. 4,208,577 discloses a photocathode screen and an output phosphor display screen that are segmented, with the segmentations of each screen being in registry with those of the other screens. In some embodiments one or more aperture masks are interposed between the scintillator-photocathode screen assembly and the output phosphor display screen, or ahead of the scintillator-photocathode screen assembly, the apertures of the masks being in registry with the segmentations of the scintillator-photocathode screen and the output phosphor display screen.

U.S. Pat. No. 5,773,829 discloses a collimator that directs radiation to scintillator segments having apertures substantially matched to collimator apertures. Photodiode array elements with active areas substantially matched to the scintillator segment apertures detect light generated when the radiation interacts with the scintillator. A cooler, low noise photodiode array and readout electronics improve the signal-to-noise ratio of the imaging system in specific embodiments.

U.S. Pat. No. 6,909,097 discloses a radiation detector, in particular a gamma camera, constructed and operated such that only a predetermined number of light sensors, e.g., PMTs, adjoining each other in a cluster are used to generate a signal with amplitude and event position information.

The camera also uses an array of individual scintillation elements, e.g., crystals, in place of a single crystal, with certain advantages obtained thereby. According to another aspect, there is a reflector sheet that defines an array of apertures through which scintillation light can pass from the scintillation crystal to a plurality of light sensors optically coupled to an optical window in an array corresponding to the array of apertures in the reflector.

U.S. Pat. No. 7,560,703 discloses a signal conduction channel having a first element that receives electrons at a first end from a vacuum environment, produces photons as the electrons are received, and propagates the photons along a length of the first element to a distal second end, and a second element that receives photons from the second end of the first element, converts the photons to electrons, and multiplies the electrons, where no additional element is disposed between the second end of the first element and the second element, except optionally at least one of a photon-conductive epoxy, a lens, and an optical coupling plate that touches both the second end of the first element and the second element.

U.S. Pat. No. 9,575,189 discloses a segmented radiation detector that may include a segmented scintillator and an optical-to-electrical converter. The segmented scintillator may have several segments that convert radiation to light, at least one of which may detect radiation arriving from an azimuthal angle around an axis of the segmented scintillator. The optical-to-electrical converter may be coupled to the segmented scintillator. The optical-to-electrical converter may receive the light from the segments of the segmented scintillator and output respective electrical signals corresponding to the amount of radiation detected by each segment.

U.S. Pat. No. 7,675,029 discloses concepts for an apparatus permitting the measurement of x-ray backscattered photons from any horizontal surface inside of a borehole that refers to two-dimensional imaging techniques.

U.S. Pat. No. 8,481,919 discloses of a method of producing Compton-spectrum radiation in a borehole without the use of radioactive isotopes, and further describes rotating collimators around a fixed source installed internally to the apparatus, but does not have solid-state detectors with collimators. The reference also discloses the use of conical and radially symmetrical anode arrangements to permit the production of panoramic x-ray radiation.

US 2013/0009049 discloses an apparatus that allows measurement of backscattered x-rays from the inner layers of a borehole.

U.S. Pat. No. 8,138,471 discloses a scanning-beam apparatus based on an x-ray source, a rotatable x-ray beam collimator and solid-state radiation detectors that enable the imaging of only the inner surfaces of borehole casings and pipelines.

U.S. Pat. No. 5,326,970 discloses a tool that measures backscattered x-rays from inner surfaces of a borehole casing, with the x-ray source being based on a linear accelerator.

U.S. Pat. No. 7,705,294 discloses an apparatus that measures backscattered x-rays from the inner layers of a borehole in selected radial directions, with the missing segment data being populated through movement of the apparatus through the borehole. The apparatus permits generation of data for a two-dimensional reconstruction of the well or borehole.

U.S. Pat. No. 9,012,836 discloses a method and means for creating azimuthal neutron porosity images in a wireline environment. Similarity to U.S. Pat. No. 8,664,587, the reference discloses a plurality of azimuthally static detectors implemented in a wireline tool to assist an operator in interpreting logs post-fracking by subdividing the neutron detectors into a plurality of azimuthally arranged detectors shielded within a moderator so as to infer incident neutron and gamma directionality.

SUMMARY

A downhole segmented radiation detector tool measuring formations surrounding a borehole is provided, the tool including at least a plurality of segments capable of detecting radiation, wherein the segments return to the tool after interacting with material surrounding the tool; and radiation shielding configured to allow radiation directly from a radiation source to pass internally through the downhole tool to a reference segment.

A method of measuring formations surrounding a borehole is also provided, the method including at least: lowering a downhole tool into a borehole surrounded by a subterranean formation; detecting a first plurality of X-rays or gamma-rays that return to the downhole tool after interacting with materials surrounding the downhole tool using a first segment of an array segmented radiation detector; and configuring associated radiation shielding to allow radiation directly from a radiation source to pass internally through the downhole tool to the reference segment.

BRIEF DESCRIPTION OF SEVERAL EXAMPLE EMBODIMENTS

The methods and means described herein enable the use of lower temperature operation scintillation materials at the high temperatures found within a borehole, without requiring active cooling or PMTs.

Figure 1:
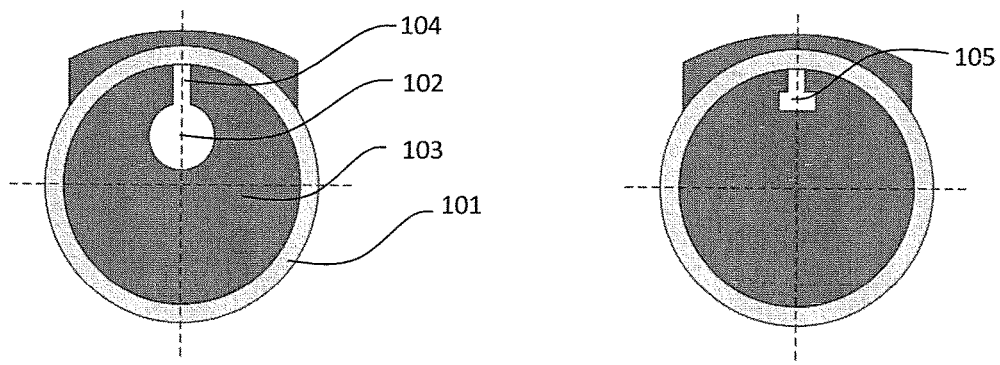
FIG. 1 illustrates a typical padded borehole logging tool having a housing and a PMT bonded to a scintillator and located within a void within shielding material.

With reference now to the attached Figures, FIG. 1 illustrates a typical padded borehole logging tool would consist a housing [101] and a PMT bonded to a scintillator, e.g., NA located within a void [102] within shielding material [103]. A hole within the shield [104] acts as a collimator window to permit radiation from a specific angle to enter the scintillator. Due to the physical requirement of the light produced within the scintillating crystals needing to reflect on the internal surfaces of the scintillator crystal, the crystals are typically produced in a cylindrical format with polished ends or sides. Similarly, PMTs are made cylindrical as a convenient geometry to withstand external atmospheric pressure, due to the inside of the PMT being evacuated (vacuum) to permit the movement of electrons. Replacement of the PMT with a segmented array detector reduces or eliminates the need for a cylindrical geometry, and permits a much smaller volume [105] to be utilized for the detector systems.

Figure 2:
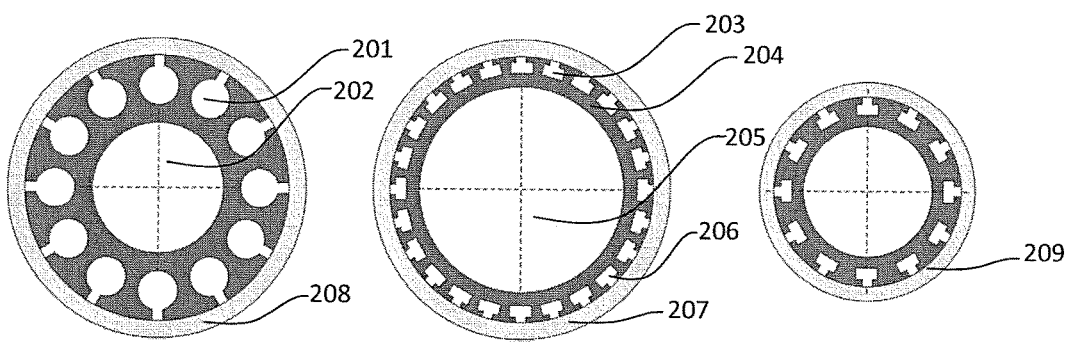
FIG. 2 illustrates a non-padded borehole tool that exhibits a plurality of detectors.

FIG. 2 illustrates a non-padded borehole tool exhibiting a plurality of detectors [201], either azimuthally, radially and/or axially disposed, wherein the size and shape of PMT/scintillator packages limit the internal volume available to other devices, such as high-voltage conductors/conduits [202] required to drive electronic radiation sources, or the tubes of electronic radiation sources themselves. As the physical volume [203] of a segmented detector is significantly smaller than a PMT/scintillator package, the shielding material surrounding the detector package may be reduced in volume [204], such that the internal volume [205] available to such other assemblies may be increased.

The additional benefit of the segmented volume scintillator package only being required- to cover a region directly at the base of any collimated shield window [206], is that more detectors per azimuthal angle or axial/radial offset can be fitted into a tool of similar outer diameter [207] compared to that with housing [208] PMTs. Alternatively, this reduction in detector volume could be used such to maintain the internal shielding geometry while reducing the outer diameter of the tool housing [209].

Figure 3:
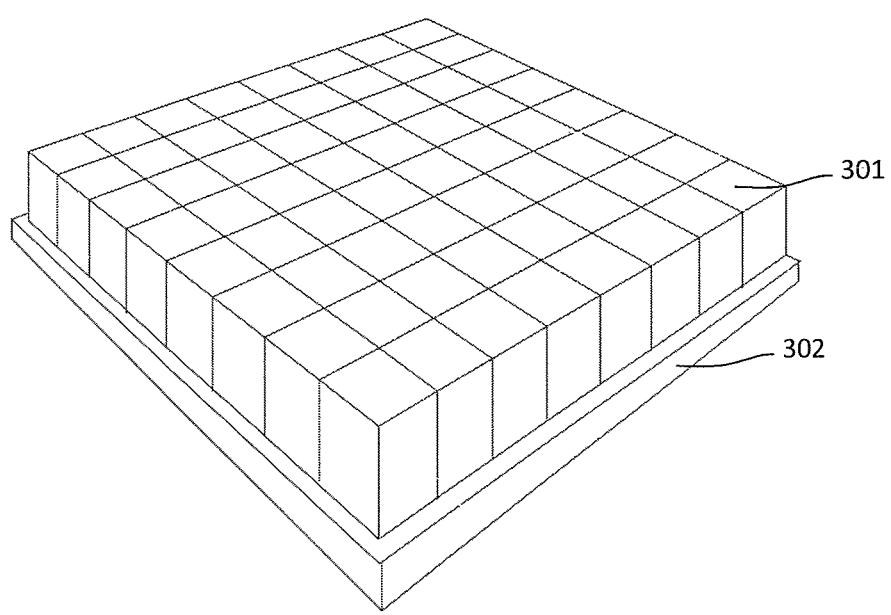
FIG. 3 illustrates the typical dark current of a single pixel detector increasing with the size of the pixel and the changes in the bandgap of the material manifest and migration of thermal electrons from the insulator band to the conductor band.

FIG. 3 illustrates the typical dark current of a single pixel detector increasing with the size of the pixel and increasing environmental temperature changes in the bandgap of the material manifest. Dark current thermal electrons migrate from the insulator band to the conductor band, thereby detrimentally affecting the signal-to-noise performance of the detector.

By segmenting the detector into an array of smaller pixels [301] at least two benefits immediately manifest. Firstly, the signals from any pixels that exhibit physical defects and/or unreasonable signals can be suppressed through simple statistical averaging. Through such means, the summation of the signals from all pixels, as sampled by the read-outcircuitry (ASIC) [301] bonded to the detector volume would yield a total count of incident photons, yet the dark current contribution as a function of temperature is diminished such that the signal-to-noise performance of the entire detector is significantly improved, thereby enabling the detector to function at much higher environmental temperatures that similar monolithic detector materials.

In one example embodiment, the method permits detectors of a much smaller physical volume than a typical photomultiplier tube and scintillator combination to be used. In yet a further embodiment, the method permits smaller, more compact, scintillator volumes to be used without the need for external/active cooling of the device. In a still further embodiment, the compact design permits more detector elements to be placed into an equivalent volume of a borehole tool (compared to PMT/scintillator materials) so as to improve azimuthal, axial and/or radial resolution. In another embodiment, the means is used to practice the method for use in a water, oil or gas well.

In another example embodiment, a padded borehole logging tool comprises a housing [101] and a photomultiplier tube bonded to a scintillator, e.g., NaI, located within a void [102] within shielding material [103]. In a further embodiment, a hole within the shield [104] acts as a collimator window to permit radiation from a specific angle to enter the scintillator. In a still further embodiment, due to the physical requirement of the light produced within the scintillating crystals needing to reflect on the internal surfaces of the scintillator crystal, the crystals are typically produced in a cylindrical format (with polished ends/sides). In yet another embodiment, PMTs are made cylindrical as a convenient geometry in order to withstand external atmospheric pressure attributable to the inside of the PMT being evacuated (vacuum) in order to permit the movement of electrons.

In yet another embodiment, replacement of the PMT with a segmented array detector would move away from the necessity for the cylindrical geometry and permit a much smaller volume [105] to be utilized for the detector systems. In a non-padded borehole tool that exhibits a plurality of detectors [201], either azimuthally, radially and/or axially arranged, the size and shape of PMT/Scintillator packages limit the internal volume available to other devices, such as high-voltage conductors/conduits [202] required to drive electronic radiation sources, or the tubes of electronic radiation sources themselves. In a further embodiment, as the physical volume [203] of a segmented detector is significantly smaller than a PMT/Scintillator package, the shielding material surrounding the detector package is reduced in volume [204] such that the internal volume [205] available to such other assemblies is increased.

In a still further embodiment, the segmented volume scintillator package covers only a region directly at the base of any collimated shield window [206], and provides the additional benefit of allowing more detectors per azimuthal angle or axial/radial offset to be fitted into a tool of similar outer diameter [207] as compared to that with housing [208] PMTs.

In a further embodiment, the reduction in detector volume is used to maintain the internal shielding geometry while reducing the outer diameter of the tool housing [209].

Typically, the dark current of a single pixel detector increases with the size of the pixel and increasing environmental temperature changes in the bandgap of the material manifest. Dark current thermal electrons migrate from the insulator band to the conductor band detrimentally affecting the signal-to-noise performance of the detector. By segmenting the detector into an array of smaller pixels [301] two benefits manifest. Firstly, the signals from any pixels that exhibit physical defects and/or unreasonable signals can be suppressed through simple statistical averaging. Through such means, the summation of the signals from all pixels, as sampled by the read-out-circuitry (ASIC) [301] bonded to the detector volume yield a total count of incident photons, yet the dark current contribution as a function of temperature is diminished such that the signal-to-noise performance of the entire detector is significantly improved, hence enabling the detector to function at much higher environmental temperatures that similar monolithic detector materials.

As the dark current of a single pixel detector increases with the size of the pixel, the pixels are sized to be a sub-volume of the equivalent single monolithic volume. The "dark current" produced on the CCD or CMOS (or within Cadmium Telluride, or Cadmium Zinc Telluride) is directly proportional to the exposure time but decreases as the detector temperature decreases. Inversely, dark current increases as the detector temperature increases, yet is also a function of the volume of the detector material. For any incoming photon, the pulse height resulting from capture within a detector system is the same regardless of whether the pixel volume is large or small. However, in a larger pixel volume, the dark current would be higher and, as such, would result in a lower signal to noise ratio. Dark current results from electrons in the high-speed tail of the Maxwell Boltzmann distribution having some finite probability of being captured by a pixel element.

Although dark current is consistently reproducible (for a fixed temperature and exposure time), there is still noise in the dark current that can overwhelm a weak true signal. Dark current thermal electrons migrate from the insulator band to the conductor band, detrimentally affecting the signal-to-noise performance of the detector. In the preferred embodiment, a detector would comprise an array of discrete scintillator volumes. By segmenting the detector into an array of smaller pixels, two benefits become apparent. Firstly, the signals from any pixels that exhibit physical defects and/or unreasonable signals can be suppressed through simple statistical averaging. Through such means, the summation of the signals from all pixels, as sampled by the read-out-circuitry (bonded to the detector volume would yield a total count of incident photons) would produce an incident photon count for the radiation that has entered the scintillator volume.

However, the dark current contribution (as a function of temperature) is diminished such that the signal-to-noise performance of the entire detector would be significantly improved, hence enabling the detector to function at much higher environmental temperatures than similar monolithic detector materials.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A downhole segmented radiation detector tool measuring formations surrounding a borehole, said tool comprising:
   a segmented radiation detector comprising a plurality of segments capable of detecting radiation, wherein said plurality of segments return to the tool after interacting with material surrounding the tool and said segmented radiation detector is configured so as to reduce the bulk volume of each segment such that the dark-noise contribution associated with increased temperature is limited, thereby enabling the detector to operate with low signal-to-noise ratios at temperatures of at least 85° C.; and radiation shielding configured to allow radiation directly from a radiation source to pass internally through the downhole tool to a reference segment.

2. The tool of claim 1, wherein the radiation comprises at least one of neutrons, X-rays, and gamma-rays.

3. The tool of claim 1, wherein the segmented radiation detector further comprises a segmented scintillator having a plurality of azimuthal segments, each of which is respectively capable of detecting radiation from a plurality of azimuthal angles around the downhole tool.

4. The tool of claim 1, wherein the segmented radiation detector further comprises a segmented scintillator having at least one axial reference segment capable of detecting substantially only radiation received directly from the radiation source.

5. A method of measuring formations surrounding a borehole, said method comprising:

lowering a downhole tool into a borehole surrounded by a subterranean formation;

detecting a first plurality of X-rays or gamma-rays that return to the downhole tool after interacting with materials surrounding the downhole tool using a first segment of segmented radiation detector, further comprising configuring the segmented radiation detector so as to reduce the bulk volume of each segment such that dark-noise contribution associated with increased temperature is limited, thereby enabling the detector to operate with low signal-to-noise ratios at temperatures of at least 85° C.; and configuring associated radiation shielding to allow radiation directly from a radiation source to pass internally through the downhole tool to the reference segment.

6. The method of claim 5, further comprising allowing radiation comprising at least one of neutrons, X-rays, and gamma-rays to pass internally through the downhole tool to the reference segment.

7. The method of claim 5, further comprising using a segmented scintillator having a plurality of azimuthal segments, each of which is respectively capable of detecting radiation from a plurality of azimuthal angles around the downhole tool.

8. The method of claim 5, further comprising using a segmented scintillator having at least one axial reference segment capable of detecting substantially only radiation received directly from a radiation source.

* * * * *